United States Patent
Holm-Hansen et al.

(10) Patent No.: US 8,255,692 B2
(45) Date of Patent: Aug. 28, 2012

(54) METHOD OF PROVIDING SECURE TAMPER-PROOF ACQUIRED DATA FROM PROCESS INSTRUMENTS

(75) Inventors: Scott Gregory Holm-Hansen, Plymouth, MN (US); Dirk Willy Bauschke, Shakopee, MN (US); Scott Andrew Johansen, Richfield, MN (US); Khoi Minh Nguyen, Eden Praire, MN (US)

(73) Assignee: Rosemount Inc., Chanhassen, MN (US)

( * ) Notice: Subject to any disclaimer, the term of this patent is extended or adjusted under 35 U.S.C. 154(b) by 794 days.

(21) Appl. No.: 12/218,185

(22) Filed: Jul. 11, 2008

(65) Prior Publication Data

US 2010/0011216 A1    Jan. 14, 2010

(51) Int. Cl.
   *H04L 9/00*    (2006.01)
(52) U.S. Cl. ......................................... 713/176; 713/181
(58) Field of Classification Search ................. 713/176, 713/193, 168, 181; 726/2; 370/216, 241
See application file for complete search history.

(56) References Cited

U.S. PATENT DOCUMENTS

| | | | |
|---|---|---|---|
| 5,682,476 A * | 10/1997 | Tapperson et al. | 370/225 |
| 6,501,390 B1 | 12/2002 | Chainer et al. | |
| 6,961,852 B2 * | 11/2005 | Craft | 713/168 |
| 7,154,297 B1 * | 12/2006 | Camarota et al. | 326/40 |
| 2003/0235306 A1 | 12/2003 | Fox et al. | |
| 2004/0139048 A1 | 7/2004 | Kerr, II et al. | |
| 2005/0010767 A1 * | 1/2005 | Craft | 713/168 |
| 2005/0270153 A1 | 12/2005 | Kwon et al. | |
| 2007/0059986 A1 | 3/2007 | Rockwell | |

OTHER PUBLICATIONS

Mihir Bellare, "Keying Hash Functions for Message Authentication" 1996.*
Authentication, Hash Functions, Digital Signatures, pp. 1-8; http://williamstallings.com/Extras/Security-Notes/lectures/authent.html; May 22, 1996.*
International Search Report and Written Opinion, Mar. 9, 2010, 10 pages.

* cited by examiner

*Primary Examiner* — Samson Lemma
(74) *Attorney, Agent, or Firm* — Kinney & Lange, P.A.

(57) ABSTRACT

Field devices used to measure process parameters can also function as a data historian by storing process data and associated time stamps. In response to a request for stored process data, the field device uses a cipher and a secret method to generate an encrypted validation string that is provided along with unencrypted information including the process data and time stamps. A validation service that maintains a secure database of field devices and their associated ciphers and secret methods can validate the unencrypted information by using the validation string.

20 Claims, 2 Drawing Sheets

METHOD OF PROVIDING SECURE TAMPER-PROOF ACQUIRED DATA FROM PROCESS INSTRUMENTS

BACKGROUND

This invention relates to the compiling and reporting of sensitive process information. In particular, the invention relates to validating acquired data from instruments used to monitor industrial processes.

Industrial process control systems typically use field devices having sensors or instruments to measure process variables such as pressure, temperature, flow, level, conductivity, pH, etc. The field devices may be connected by wires or by wireless communication links to a control room where the measured process variables are monitored.

It is common for data representing the measurements made by field devices to be stored, so that it can later be reviewed. Paper charts, for example, may be used to show one or more of the process variables as a function of time. The compiled data may also be made available to government regulatory bodies or to business interested parties (such as utility companies, commodity consumers, chemical manufacturers regulated by government agencies, and customers that are regulated by agencies such as the Food and Drug Administration and the Environmental Protection Agency).

The use of charts representing data acquired over time raises reliability and accuracy issues, and the possibility of tampering with the data that is represented on the charts. Electronic systems used to store and report acquired process information also can suffer from the same issues in the absence of security protection for the data that is stored and validation of the accuracy of the data.

SUMMARY

Validation of process data generated by an industrial process control system is provided by the use of a cipher that is loaded into a field device at the factory. Data produced by the field device includes an associated validation string (e.g. an encrypted check such as a checksum or cyclic redundancy check) that is generated by the field device based upon the cipher.

The process data and its associated validation string can be validated by a third party, such as the manufacturer of the field device, using a database that associates each field device with its associated cipher. If either the process data or the validation string have been corrupted (e.g. altered or damaged), the decrypted validation string can be used to identify the existence of a corruption.

DETAILED DESCRIPTION

Figure 1:
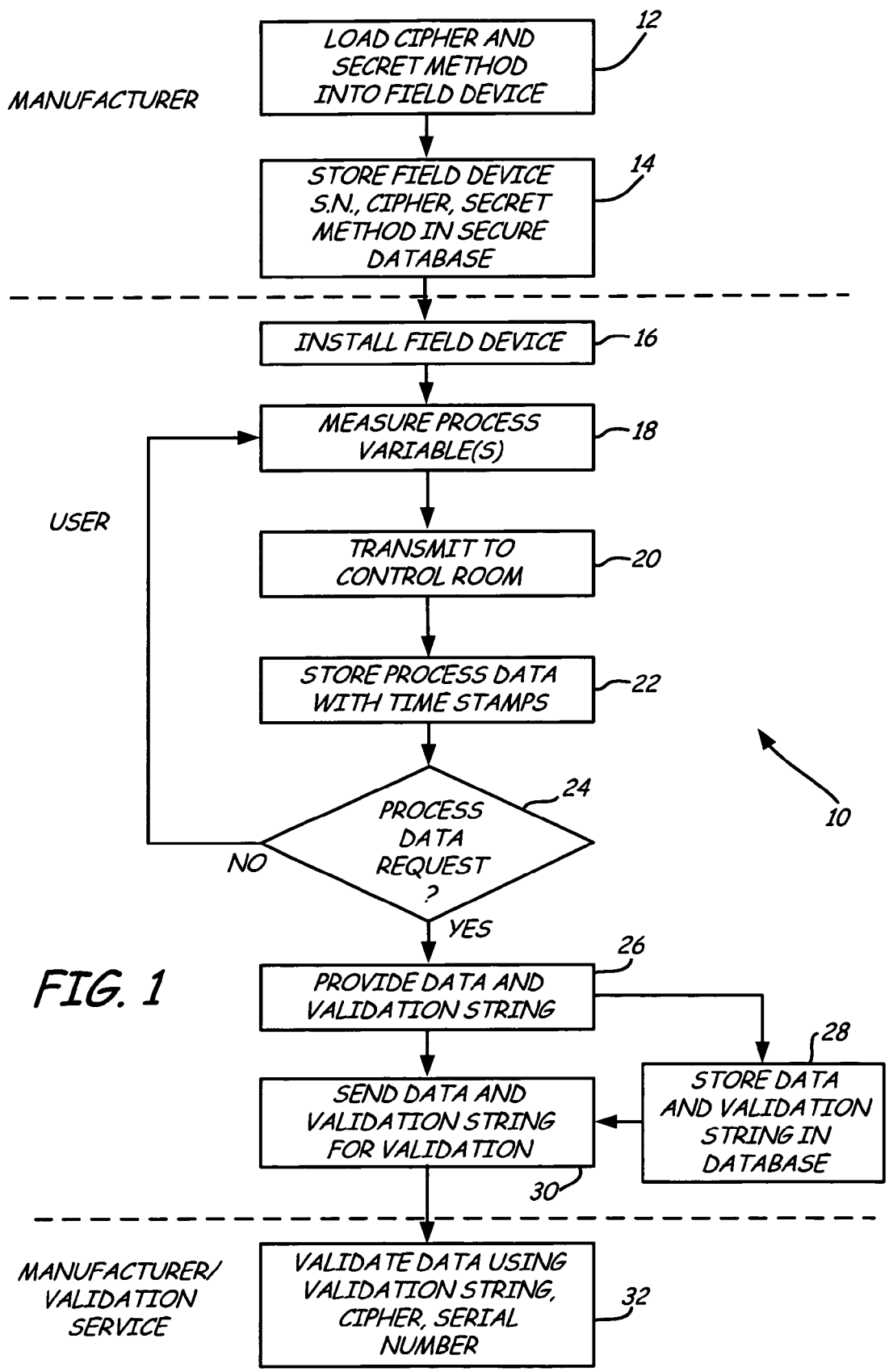
FIG. 1 is a diagram illustrating a method and system for validating process data sensed and stored by an industrial process field device.

FIG. 1 shows a method in which process data acquired by an industrial process field device or instrument can be stored and later validated, so that a party requesting the data has assurance that the process data has not been subject to alteration or other tampering. Process 10 begins at the time of manufacturing of the field device. The manufacturer loads a secret key or cipher into nonvolatile memory of the field device. In addition, the field device is programmed with stored code contained in nonvolatile memory that defines a secret method of producing a validation string (or encrypted check) of stored process data using the site.

The cipher is maintained as a secret by the manufacturer, and is typically a randomly generated number. The manufacturer stores the serial number of the field device and the cipher for that field device in a secure database (step 14).

The field device is then sold and delivered to a user, who will install the field device as part of an industrial process monitoring/control system (step 16). For example, the field device may be connected to a control room through a two wire loop, may be connected to a wired multi-drop digital network, or may be installed in a wireless digital network, such as a wireless mesh network.

As part of the installation process, the user will configure the field device for the particular application. The user may define, for example, maximum and minimum values of the process variable sensed by the field device, so that the field device can report when the process variable is outside a normal range. The user may also define process data to be stored by the field device for later reporting, and the frequency in which the data is to be stored. The user is not permitted, however, to access or alter the cipher, or to access the code defining the encryption method to be used by the field device to generate the validation string (or encrypted check) as part of the validation process.

Once the field device has been installed and activated, it will begin measuring one or more process variables (step 18). The process variable may be, for example, differential pressure, gauge pressure, absolute pressure, temperature, flow rate, fluid level, conductivity, pH, or the like. The field device may sense a primary process variable (e.g. pressure) and one or more secondary process variables (such as ambient temperature) that are used for compensation of the measured primary process variable.

The field device transmits measured process variable information to a control room, where the process variable information may be displayed, recorded on the strip charge recorders, or used as input to a process control system. The output of the field device may be in the form of an analog signal that varies, for example, from 4 milliamps to 20 milliamps as a function of the process variable. Alternatively, the output of the field device may be in the form of digital data transmitted, for example, using the HART protocol or the Foundation Fieldbus protocol.

The field device periodically stores process data along with an associated time stamp (step 22). The process data may represent one or multiple process variables, and may also include data representing whether a process variable is within a specified range. Diagnostic data relating to the operation of field device may also be stored as part of the process data.

The time stamps will typically include a date, as well as a time. The process data and the time stamps are stored in unencrypted form within nonvolatile memory of the field device. By storing the process data in nonvolatile memory, the data will be preserved even if a loss of power to the field device occurs.

The field device continues to measure process variables, transmit its output to the control room, and periodically store process data with time stamps. The process data and time stamps will continue to be stored in nonvolatile memory of the field device until a request is made for the stored process data (step 24). The process data request may be made by the user, a customer of the user, or a government regulatory body. The user may request the process data, for example, for its own quality control processes, for its own monitoring of compliance with government regulations, in response to a request from a customer or government regulator, or in order to transfer the stored process data and time stamps from the field device to a larger database, while maintaining the ability to validate the process data and time stamps at a later time.

A customer of the user may make a request for its own quality assurance programs, or to ensure that the manufacturing process being performed by the user on behalf of the customer complies with government regulations. The customer will typically make the request to the user in order to initiate the process of obtaining validated process data.

Government regulators may make requests through the user, or may conduct inspections during which the regulator obtains data directly from the field device. The requests by the government regulators (as well as the customer) may come at unexpected times.

In response to a request for process data, the field device provides the stored process data and time stamps, along with an encrypted check or validation string (step 26). The process data and time stamps are provided in an unencrypted form, so that the user, customer, or government regulator can read the data. The information provided may also include an identification of the name of the user, an identification of the particular process in which the field device is used, the type of field device, its model or serial number, and configuration information such as process variable limits. The information will also typically include the time stamp (date and time), the process variable, and the status of the process variable (i.e. is it within limits based upon the limits previously set).

The encrypted check or validation string is generated by the field device using the cipher or secret key and the secret method for generating the encrypted check or validation string. As an example, the field device may take all of the information that is reported and then create a cyclic redundancy check (CRC). The field device then encrypts the CRC using the cipher that is stored in that field device and is unique to that field device. Other techniques can also be used to generate a validation string or encrypted check using a secret key or cipher, a secret method of using that secret key or cipher, and the unencrypted information.

In one embodiment, the process data request is generated at the control room, and sent to the field device over the loop or network through which the field device and the control room communicate. The process data, time stamps, and related information, along with the validation string may then be transmitted back to the control room by the field device.

In another embodiment, a handheld device capable of communicating directly with the field device may be used to both send the request to the field device, and to receive the unencrypted information and the encrypted check from the field device. The handheld device may be connectable to the loop or network or to terminals of the field device, or may communicate wirelessly with the field device.

In another embodiment, the field device includes a removable memory element, such as a flash memory card on which the process data and time stamps are stored. When user, customer, or government regulator attempts to remove the memory device from the field device, the validation string is first calculated and stored on the removable memory device, before the removable memory device can be removed. In that way, the memory device will contain the unencrypted information, along with the validation string needed to validate that the information on the memory device has not been subject to tampering or otherwise been corrupted.

If the user has made a request for process data in order to make room for the field device to store additional process data, the data and encrypted validation string from the field device is first stored in a database (step 28). Because the data and the encrypted validation string are stored together, that data can later be validated, even though it has been moved from the field device to the larger database.

When validation of the data is needed, the data and the encrypted validation string is sent to the manufacturer or a validation service for validation (step 30). The validation service may be operated by the manufacturer itself, or may be an independent service that has been provided stored serial numbers and ciphers for field devices manufactured by the manufacturer, and information regarding the secret method used to generate the encrypted validation string.

The manufacturer or validation service then validates the data using the encrypted validation string and the cipher associated with the serial number for the particular field device that generated the process data. For example, by using the unencrypted data, the encrypted validation string, the cipher, and the same secret method used by the field device that generated the data, the manufacturer/validation service should generate an encrypted check or validation string that matches the one provided with the data. Alternatively, the manufacturer/validation service could decrypt the validation string to produce an unencrypted check such as a CRC, and then run a CRC on the unencrypted data to see whether there is a match. The manufacturer/validation service then reports to the interested party or parties, such as the user, customer, or government regulator whether the data is valid, or whether tampering has occurred to either the data, or to the validation string, or both.

Figure 2:
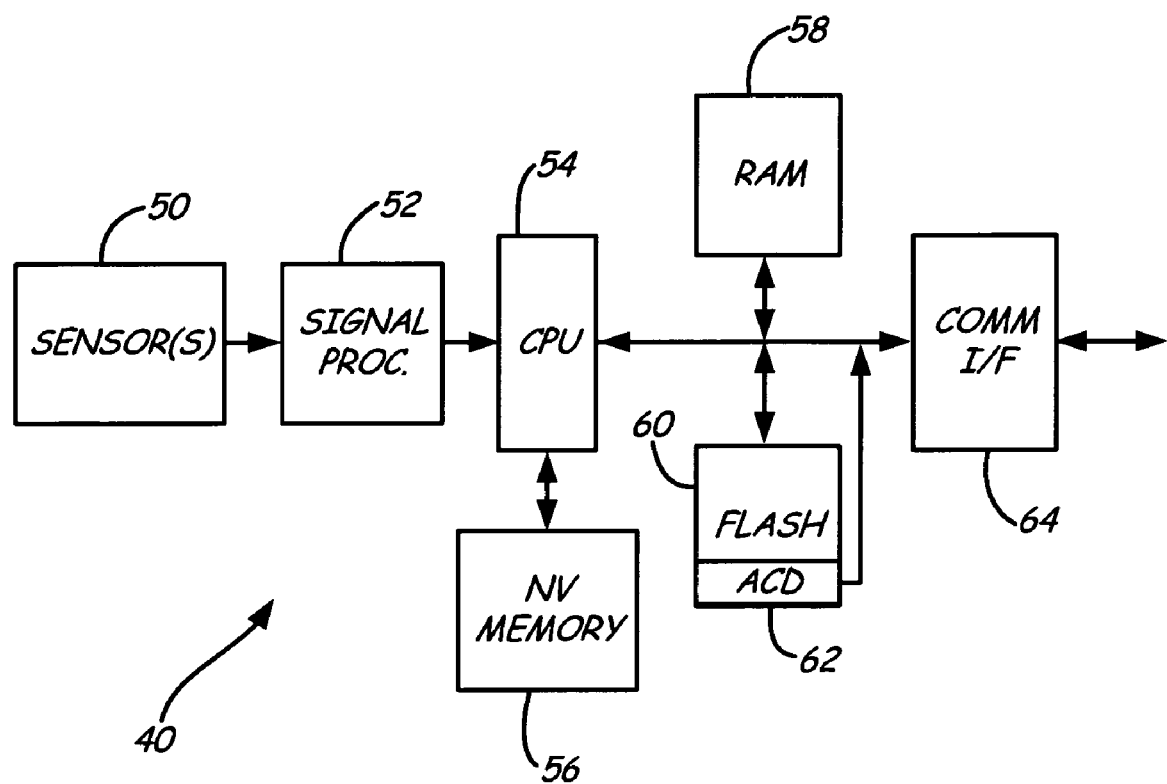
FIG. 2 is a block diagram illustrating a field device usable in the method and system of FIG. 1.

FIG. 2 is a block diagram illustrating field device 40, which is an example of one type of field device that can be used in conjunction with method 10 shown in FIG. 1. Field device 40 includes sensor(s) 50, signal processing circuitry 52, central processing unit (CPU) 54, nonvolatile memory 56, random access memory (RAM) 58, flash memory 60, access control device 62, and communication interface 64.

Sensors 50 sense one or more process parameters (or process variables) and provide sensor signals to signal processing circuitry 52. The sensor signals may include a primary variable (e.g. pressure) and a secondary variable (e.g. temperature). The secondary variable may be used by CPU 54 for correction or compensation of the sensor signal representing the primary variable.

Signal processing circuitry 52 typically includes analog-to-digital conversion circuitry, as well as filtering and other signal processing to place the sensor signals into a format that can be used by CPU 54. For example, signal processing circuitry 52 may include one or more sigma-delta analog-to-digital converters and digital filters to provide digitized and filtered sensor signals to CPU 54.

CPU 54 coordinates the operation of field device 40. It processes data received; it receives and stores sensor signals generated by sensor(s) 50 and signal processing circuitry 52; and it creates and selects data to be contained in messages that will be transmitted from field device 40. CPU 54 also performs the secret method used to generate a check for the stored process data and associated information (such as a CRC), and then to encrypt the check to generate an encrypted validation string. CPU 54 is typically a microprocessor with associated memory, such as nonvolatile memory 56, random access memory 58, and flash memory 60.

Nonvolatile memory 56 stores application programming used by CPU 54, including the secret method for producing the validation string. In addition, nonvolatile memory 56 obtains stored configuration data for field device 40, calibration data, and other information required by CPU 54 to control the operation of field device 40, including the cipher. In one embodiment, nonvolatile memory 56 includes EEPROM storage for all of the configuration data of field device 40. That configuration data can be uploaded to field device 40 during a configuration process, and can be downloaded from field device 40. The stored cipher, and the code for the secret method, however, cannot be downloaded in order to prevent unauthorized access to either the cipher of the secret method.

Flash memory 60 may include a removable memory card, as discussed above. In that embodiment, flash memory 60 may include access control device 62 that signals CPU 54 when an attempt is made to remove the memory card. CPU 54 then generates and stores the validation string on the memory card before it is removed.

Communication interface 64 serves as the interface of field device 40 with the loop or network. Communication interface 64 may provide analog as well as digital outputs, and may include a wireless transceiver if field device 40 is part of a wireless network. Communication interface receives messages from the loop or network (including requests for process data to be validated) and provides those messages to CPU 54.

The data validation method makes use of the field device as a data historian. During the course of normal operation of the field device, process data and associated time stamps are stored at intervals that can be set by the user. The frequency of collecting and storing the data can be selected based upon the nature of the process being monitored, the variability of the process variable or variables being monitored, and the particular process/quality control requirements of the user and customer, as well as any applicable government regulations.

By encrypting only the validation string, and not the process data and time stamps, the user can review the process data to verify that quality and regulatory issues are being met. The validation string allows the user, the customer, or the government regulator to receive validation that the unencrypted data provided has not been the subject of tampering.

Because the cipher and the secret method are known only to the manufacturer (or validation service) and not to the user, the method provides a way of electronically storing process data and generating a history or archive of that process data that can be used and validated in the event that disputes later arise with customers, or with government regulators.

The data validation process makes use of information stored in a secure database at the manufacturer or data validation service. As a result, the validation process can be performed quickly by sending the data and encrypted validation string electronically to the manufacturer or validation service. On-line validation of data, therefore, is possible.

Because the field device is continually storing process data with time stamps, the user can access process data whenever a government regulator chooses to perform an audit or inspection. The ability to store data and the encrypted validation string in a larger database allows the user to maintain data collected by the field device over long periods of time, while still providing the ability to validate data at any time that it is needed.

The method provides advantages even in those cases in which government regulations require that a circle chart recorder be used. The method can provide a reliable backup of critical process data in the event that the circle chart recorder runs out of ink or otherwise malfunctions so that charts are not available for certain periods of time.

Although the present invention has been described with reference to preferred embodiments, workers skilled in the art will recognize that changes may be made in form and detail without departing from the spirit and scope of the invention.

The invention claimed is:

1. A method of providing validated data related to an industrial process, the method comprising:
   sensing a process variable of the industrial process with a field device having a stored cipher and secret method for data validation;
   transmitting a first message containing the sensed process variable to a control room;
   periodically storing, in the field device, stored data including a history of process data representative of the process variable;
   transmitting a second message in response to a request for data, the second message containing the stored data from the field device together with an encrypted validation string generated by the field device using the stored data, the cipher, and the secret method; and;
   providing the stored data in unencrypted form and the encrypted validation string to a third party validator with knowledge of the cipher and secret method used by the field device for validation of the stored data based upon the validation string.

2. The method of claim 1, wherein the stored data includes the process data representative of the process variable and an associated time stamp.

3. The method of claim 2, wherein the stored data further includes data representing whether the process variable was with a specified range.

4. The method of claim 1, wherein the field device stores the stored data in nonvolatile memory within the field device.

5. The method of claim 1, wherein the stored data includes data identifying the field device.

6. The method of claim 5 and further comprising:
   maintaining a secure database associating field devices and ciphers.

7. The method of claim 1, wherein generating an encrypted validity string comprises:
   generating a cyclical redundancy check (CRC) based upon the stored data; and
   encrypting the CRC using the cipher.

8. A method of providing validated historical process data produced by an industrial process monitoring/control system that includes field devices and a control room, the method comprising:
   sensing a process variable of an industrial process with the field device;
   transmitting a first message containing process variable information based upon the sensing from the field device to the control room;
   storing, within the field device, a history of process data produced by the field device;
   generating at the wireless device, in response to a request, an encrypted validation string based upon the process data, a cipher stored in the field device, and a secret method programmed into the field device; and
   transmitting a second message in response to the request, the second message including the history of process data in unencrypted form together with the encrypted validation string.

9. The method of claim 8 and further comprising:
   providing the information and the encrypted validation string for validation of the history of process data based upon the validation string.

10. The method of claim 9 and further comprising:
    identifying which field device of the industrial process monitoring or control system generated the validation string;

determining the cipher associated with the identified field device; and determining whether the information is valid using the validation string and the cipher associated with the identified field device.

11. A method of validating process data stored by a field device that senses a process variable and transmits process variable information to a control room of an industrial process monitoring/control system, the method comprising:

storing a cipher in the field device;

programming the field device to sense the process variable and transmit first messages containing sensed process variable information; to periodically store process data history; to generate, upon a request for stored process data, an encrypted validity string using the stored process data and the cipher; and to transmit second messages containing the stored process data history and an identification of the field device in unencrypted form along with the encrypted validity string;

storing in a secure database an association between the field device and the cipher;

receiving process data for validation, along with the encrypted validation string and the identification of the field device, from the second messages; and determining whether the process data has been corrupted using the cipher associated with the identified field device in the secure database and the validation string.

12. The method of claim 11 and further comprising:

storing in the field device instructions for performing a secret method for generating the encrypted validity string.

13. A field device for use in an industrial process monitoring or control system, the field device comprising:

a sensor for providing a sensor signal as a function of a sensed process parameter;

signal processing circuitry for processing the sensor signal to produce process data;

nonvolatile memory for storing process data, a cipher, and instructions for generating validation strings using the cipher;

a processor for periodically storing process data in nonvolatile memory to provide a history of process data, and for producing, in response to a request for the history of process data, unencrypted information including the history of process data and an encrypted validation string based on the cipher and the unencrypted information; and a communication interface for transmitting first messages containing process variable information based upon process data, and second messages containing the unencrypted information and the encrypted validation key.

14. The field device of claim 13, wherein the communication interface receives the request for the history of process data, and transmits the unencrypted information and the encrypted validation string produced in response the request.

15. The field device of claim 13 and further comprising:

a removable memory device for storing the unencrypted information and the encrypted validation string.

16. The field device of claim 15 and further comprising:

an access control device for signaling the processor to generate the encrypted validation string and store it on the removable memory device before the removable memory device is removed from the field device.

17. The field device of claim 13, wherein the information includes an identification of the field device.

18. The field device of claim 13, wherein the information includes the process data and associated time stamps.

19. The field device of claim 18, wherein the information includes status of a process variable with respect to previously set limits.

20. The field device of claim 13, wherein the cipher and the instructions are stored in a location within the nonvolatile memory that is not accessible by a user of the field device.

* * * * *